Aug. 21, 1934.  R. B. COTTRELL  1,970,841
TRUCK
Original Filed Sept. 24, 1932  2 Sheets-Sheet 2
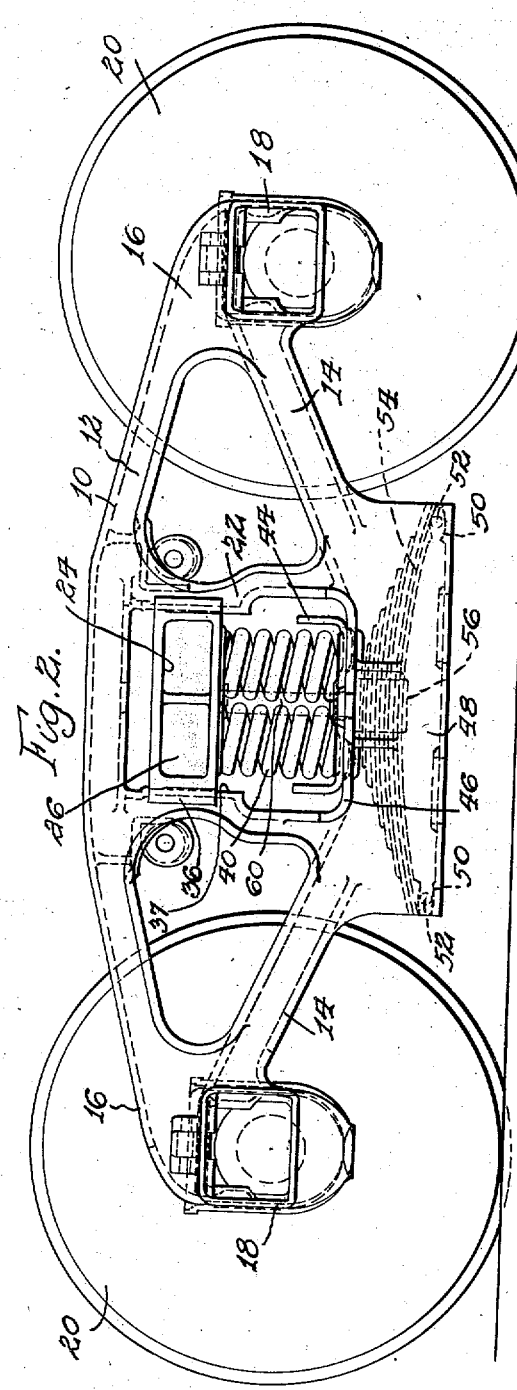
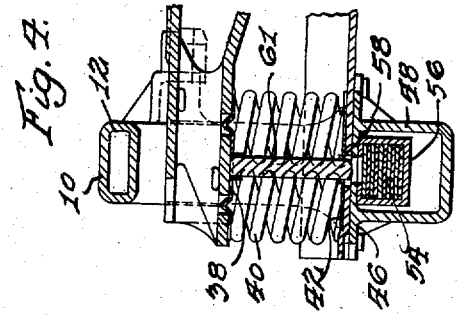
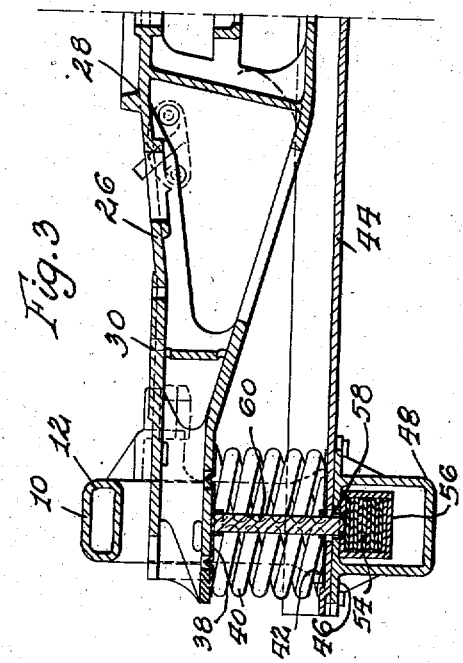
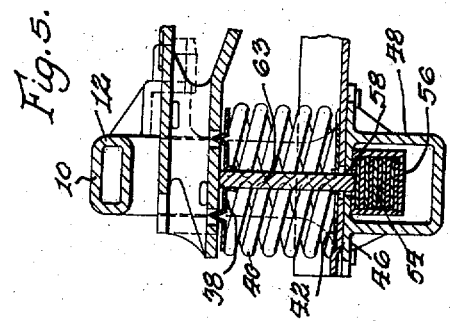
Inventor
By Robert B. Cottrell,
By Wilkinson, Huxley, Byron & Knight
Attorneys Patented Aug. 21, 1934

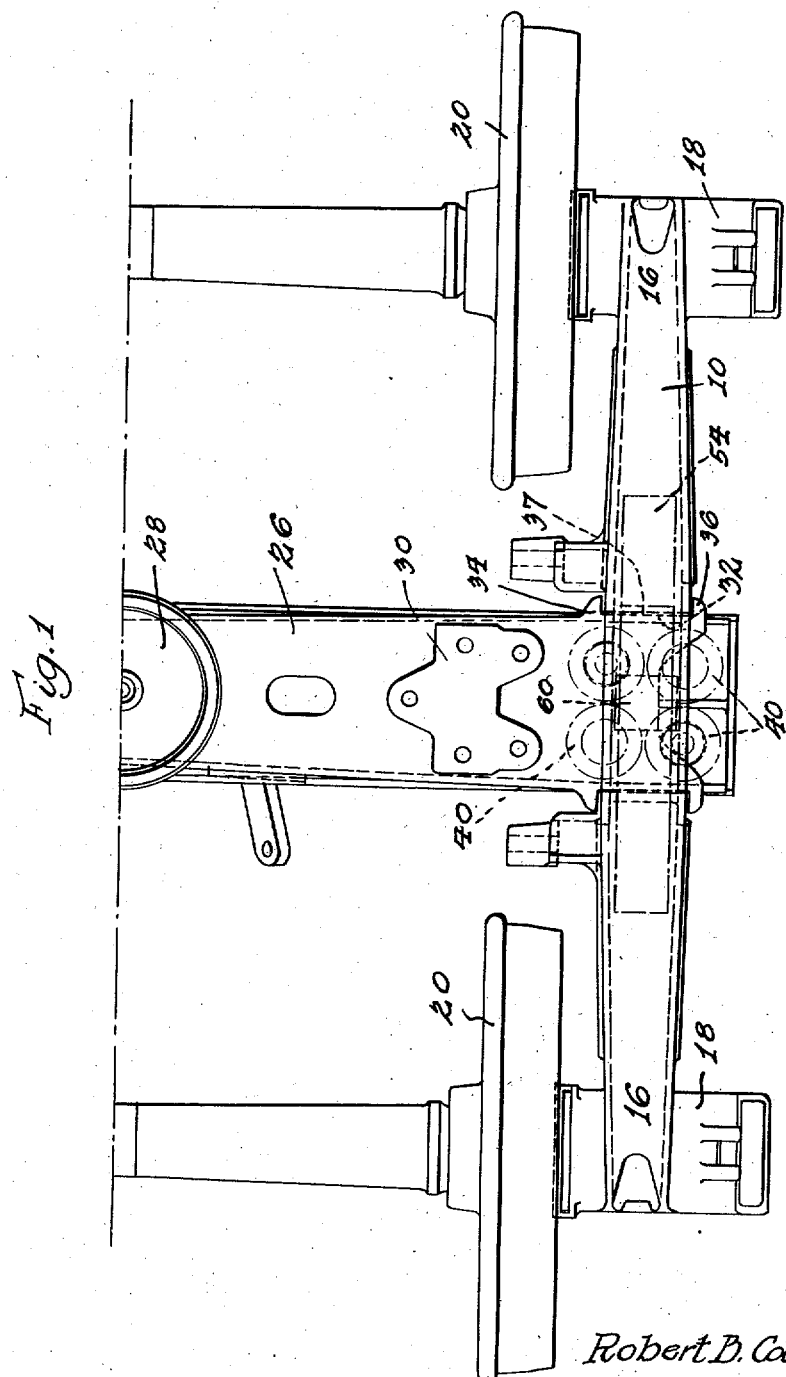

1,970,841

UNITED STATES PATENT OFFICE 1,970,841

TRUCK

Robert B. Cottrell, Chicago, Ill., assignor to American Steel Foundries, Chicago, Ill., a corporation of New Jersey Original application September 24, 1932, Serial No. 634,747. Divided and this application November 10, 1932, Serial No. 642,094

36 Claims. (Cl. 105—197)

This invention pertains to truck construction, and more particularly to four-wheel trucks adapted particularly for high speed freight car use.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity; that is, in constructions heretofore contemplated a device constructed to provide sufficient friction for rough track conditions would be inadequate and the spring devices used would be too stiff for average or good track conditions.

Passenger car trucks are generally easy riding, due to the use of both coil and elliptic leaf springs in series; the coil springs responding to the light, quick shocks, the leaf springs to the slow, heavy impulses. Coil springs are quick and sensitive to response, leaf springs relatively less so, partly due to frictional work absorption between the leaves. For this reason, and also by providing coil and leaf springs or springs of different characteristics, they tend to dampen each other's vibration without impairing free spring response.

Although the usual passenger car truck with series arrangement of coil and leaf springs gives good riding qualities, it is in general undesirably heavy, costly and complicated for freight service. This is particularly due to the complete duplication of carrying capacity in both coil and leaf springs.

It is therefore an object of this invention to provide a car truck which provides good riding qualities, and at the same time is economical to make and maintain, is simple and light in construction and fulfills all requirements of manufacture and service.

Another object is to provide a car truck wherein springs of different character are arranged so that each tends to dampen out the vibrations of the other.

Still another object is to provide spring assemblies wherein there is provided softer cushioning action under light loads, while at the same time providing the necessary stiffness and capacity under heavy loads, these features being combined also to provide a structure which reduces any tendency toward synchronous vibration of the springs.

Yet another object of the invention is to provide a truck construction wherein quick and inexpensive wheel change can be effected.

A still further object is to provide a truck construction wherein springs of different character may be arranged for initial serial or parallel operation.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary top plan view of a truck construction embodying the invention;

Figure 2 is a side elevation of the truck construction shown in Figure 1;

Figure 3 is a transverse fragmentary sectional elevation of the truck construction shown in Figures 1 and 2, the same being taken substantially in the plane of the transverse center line of the truck; and Figures 4 and 5 are transverse fragmentary sectional elevations corresponding to Figure 3 showing other modified forms of truck constructions embodying the invention.

This case is a division of application, Serial Number 634,747, filed September 24, 1932.

Referring first of all more particularly to the truck construction shown in Figures 1, 2 and 3, the truck side frame 10 consists essentially of the compression member 12 and the tension member 14, said members merging adjacent the ends thereof as at 16 and being provided with the journal boxes 18 having cooperative relation with the journal ends of the wheel and axle assemblies 20. The side frame is provided with the spaced struts or columns 22 formed integral with the tension and compression members and disposed to form the window 24 therewith. The load carrying member, which, in the construction shown is the bolster 26 having the center and side bearings 28 and 30, is provided with an end portion extending into the window 24 and provided with column guide cooperating surfaces 32 defined by the inner and outer spaced lugs 34 and 36 and having sliding cooperation with the column guides 37 of the columns 22. The end portion of the bolster adjacent the window 24 is provided with the spring seat 38 accommodating the coil springs 40. The coil springs supporting the bolster are shown as disposed on the spring seat 42 provided on the spring plank 44, the spring plank serving to tie the spaced side frames 10 together, though it is to be understood that this spring plank may be omitted.

The spring plank 44 is supported on the widened seat 46 of the tension member 14, said seat being disposed between the columns 22. The tension member 14 adjacent the center thereof is provided with the spring housing 48 formed integral with the tension member and disposed below the window 24. The housing 48 is provided adjacent the ends thereof with the spring or roller seats 50 for accommodating the antifriction rollers 52 which are interposed between the seat 50 and the ends of the semi-elliptic leaf spring assembly 54. The semi-elliptic leaf spring assembly 54 is provided with the central spring band 56, and the seat 46 and the spring plank 44 are slotted as at 58 for accommodating the plunger or column 60 provided for the bolster and engaging the spring band or leaf spring assembly. It will thus be appreciated that the bolster is supported on coil and elliptic springs arranged substantially in parallel, movement of the bolster being resiliently resisted by both the coil and elliptic springs whereby the friction between the leaves of the elliptic spring serve as a dampener on the oscillations of the springs of the helical groups. An alternative arrangement may be made by providing a shortened plunger 61, as shown in Figure 4, whereby the bolster is initially supported by only the coil springs. In this arrangement a predetermined movement of the bolster is necessary before the leaf springs operate so that there will be a serial operation of the resilient means. The resilient support may also be reversed wherein the bolster is initially supported by the leaf springs, in which case the plunger 63 would be lengthened as shown in Figure 5.

Increased spring capacity is obtained by the arrangement of the trucks illustrated; further, a very light helical spring may be used as the capacity of the springs is supplemented by that of the leaf springs. In this type of truck the spaced struts tend to make the loads more widely distributed whereby a truck frame of increased strength is provided, and of course a much lighter truck may be provided with this type of side frame, as no spring plank is necessary.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is:

1. In a car truck, the combination of tension and compression members, spaced integral connecting columns forming a window with said tension and compression members, said tension member having a spring housing disposed below said window, said housing having spaced seats therein fixed with respect thereto and being slotted for communication with said window, spring means supported on said seats, a load carrying member supported on coil springs in said window and provided with a member extending through the slot and in engagement with said spring means, said spring means being of different character than said coil springs and operating in the same direction as said coil springs.

2. In a car truck, the combination of tension and compression members, spaced integral connecting columns forming a window with said tension and compression members, said tension member having a spring housing disposed below said window, said housing having spaced seats on a portion thereof and within the same and being slotted for communication with said window, a leaf spring on said seats, a load carrying member supported on coil springs in said window and provided with a member extending through the slot and in engagement with said leaf spring.

3. In a car truck, the combination of tension and compression members, spaced integral connecting columns forming a window with said tension and compression members, said tension member having a spring housing disposed below said window, said housing having spaced seats on a portion thereof and within the same and being slotted for communication with said window, a semi-elliptic leaf spring on said seats, a load carrying member supported on coil springs in said window and provided with a member extending through the slot and in engagement with said semi-elliptic leaf spring.

4. In a car truck, the combination of tension and compression members, spaced integral connecting columns forming a window with said tension and compression members, said tension member having a spring housing disposed below said window, said housing having spaced seats on a portion thereof and within the same and being slotted for communication with said window, spring means on said seats, a load carrying member supported on resilient means in said window and provided with a member extending through the slot and in engagement with said spring means, said spring means being of different character than said resilient means and acting in the same direction as said resilient means.

5. In a car truck, the combination of tension and compression members, spaced integral connecting columns forming a window with said tension and compression members, said tension member having a spring housing disposed below said window, said housing having spaced seats on a portion thereof and within the same and being slotted for communication with said window, a leaf spring on said seats, a load carrying member supported on resilient means in said window and provided with a member extending through the slot and in engagement with said leaf spring.

6. In a car truck, the combination of tension and compression members, spaced integral connecting columns forming a window with said tension and compression members, said tension member having a spring housing disposed below said window, said housing having spaced seats on a portion thereof and within the same and being slotted for communication with said window, a semi-elliptic leaf spring on said seats, a load carrying member supported on resilient means in said window and provided with a member extending through the slot and in engagement with said semi-elliptic leaf spring.

7. In a car truck, the combination of tension and compression members, spaced integral connecting columns forming a window with said tension and compression members, said tension member having a spring housing disposed below said window, said housing having spaced seats on a portion thereof and within the same and being slotted for communication with said window, a semi-elliptic leaf spring anti-frictionally supported on said seats, a load carrying member supported on coil springs in said window and provided with a member extending through the slot and in engagement with said semi-elliptic leaf spring.

8. In a car truck, the combination of a side frame, a spring housing disposed thereon, said housing having spaced seats on a portion thereof and within the same and being slotted, a semi-elliptic leaf spring supported on said seats, a load carrying member supported on said side frame by coil springs and being provided with a member extending through the slot and in engagement with said leaf spring.

9. In a side frame, the combination of tension and compression members merging adjacent the ends thereof and provided with journal boxes, spaced columns integrally connecting said tension and compression members and forming a window, the tension member in said window forming a seat and having a slot therein, and a spring housing disposed below said seat, said housing being provided with spaced leaf spring seats on a portion thereof and within the same.

10. In a side frame, the combination of journal boxes, a member connecting said journal boxes, said member having a seat portion, and a spring housing disposed adjacent said seat portion, said seat portion forming the roof of said housing, said housing being provided with spaced leaf spring seats on a portion thereof and within the same.

11. In a car truck, the combination of tension and compression members, spaced integral connecting columns forming a window with said tension and compression members, said tension member having a spring housing disposed below said window, said housing having spaced seats on a portion thereof and within the same and being slotted for communication with said window, friction spring means on said seats, a load carrying member supported on coil springs in said window and provided with a member extending through the slot and being arranged to operate said spring means only after a predetermined movement of said load carrying member, said coil spring acting in the same direction as said friction spring means.

12. In a car truck, the combination of tension and compression members, spaced integral connecting columns forming a window with said tension and compression members, said tension member having a spring housing disposed below said window, said housing having spaced seats on a portion thereof within the same and being slotted for communication with said window, a leaf spring on said seats, a load carrying member supported on coil springs in said window and provided with a member extending through the slot and being arranged to operate said leaf spring only after a predetermined movement of said load carrying member.

13. In a car truck, the combination of tension and compression members, spaced integral connecting columns forming a window with said tension and compression members, said tension member having a spring housing disposed below said window, said housing having spaced seats on a portion thereof and within the same and being slotted for communication with said window, a semi-elliptic leaf spring on said seats, a load carrying member supported on coil springs in said window and provided with a member extending through the slot and being arranged to operate said leaf spring only after a predetermined movement of said load carrying member.

14. In a car truck, the combination of tension and compression members, spaced integral connecting columns forming a window with said tension and compression members, said tension member having a spring housing disposed below said window, said housing having spaced seats on a portion thereof and within the same and being slotted for communication with said window, a semi-elliptic leaf spring on said seats, a load carrying member extending into said window and having a member extending through the slot and in engagement with said leaf spring, and coil springs in said window adapted to be operated by said load carrying member only after a predetermined movement thereof.

15. In a railway vehicle, in combination, a side frame formed with compression and tension members spaced at intermediate portions by guide columns leaving a bolster opening therebetween, the portion of the tension member beneath the bolster opening being hollow, spaced spring seats fixed in said housing, semi-elliptic leaf spring means enclosed in said hollow portion beneath the bolster opening and supported by said seats, spring means of a different type seated on said tension member above said enclosed spring means and acting in substantially the same direction, and a bolster supported by both of said spring means.

16. In a car truck including a bolster and a side frame having a shelf, spring means on said shelf for supporting the bolster, and semi-elliptic leaf spring means below said shelf and extending longitudinally of the side frame for supporting the bolster, said leaf spring means being supported at the ends thereof on fixed seats on said side frame and within the vertical plane thereof.

17. In a car truck including a bolster and a side frame having a shelf, spring means on said shelf for supporting the bolster, and leaf spring means below said shelf for supporting the bolster, said leaf spring means being located entirely within the confines of the side frame and extending longitudinally of the latter, said leaf spring means being supported at the ends thereof on fixed seats on said side frame and within the vertical plane thereof.

18. In a car truck including a bolster, a side frame having a shelf and a tension portion extending below said shelf, spring means on said shelf for supporting the bolster, leaf spring means in said tension portion for supporting said bolster, said leaf spring means being located entirely within the confines of said tension member, said leaf spring means being supported at the ends thereof on fixed seats on said side frame and within the vertical plane thereof, and means supporting said leaf spring means in an elevated position with respect to the bottom of said tension portion.

19. In a car truck, a bolster, a side frame having a shelf and a tension portion below said shelf, leaf spring means extending longitudinally of the side frame and positioned within the side walls of said tension portion, and means on said bolster projecting through said shelf for engagement with said leaf spring means, said leaf spring means being supported at the ends thereof on fixed seats on said side frame and within the vertical plane thereof.

20. In a car truck, the combination of a side frame having tension and compression members and spaced connecting struts disposed therebetween, a spring supported on said side frame, a load carrying member supported on said spring, a spring of different form from said first named spring seated on said side frame at a plurality of points in the plane of said frame and below the support of said first named spring on said side frame, and a member embraced by a portion of said side frame and interposed between one of said springs and said load carrying member whereby said springs support said load carrying member in parallel.

21. In a car truck, the combination of a side frame having tension and compression members and spaced connecting struts disposed therebetween, a spring supported on said side frame on a seat disposed between said struts, a load carrying member supported on said spring, and a spring of different form from said first named spring for supporting said load carrying member in parallel with said first named spring, said last named spring being seated on said side frame below the support of said first named spring on said side frame, one of said springs being a longitudinally disposed leaf spring supported by spaced seats disposed on said side frame in the plane of said side frame.

22. In a car truck, the combination of a side frame having tension and compression members and spaced connecting struts disposed therebetween, said tension member having upper and lower members, a spring supported on said upper member, a load carrying member supported on said spring, and a spring of different form from said first named spring for supporting said load carrying member in parallel with said first named spring, said last named spring being seated on said lower member on spaced seats disposed thereon.

23. In a car truck, the combination of a side frame having tension and compression members and spaced connecting struts disposed therebetween, said tension member having upper and lower members, a spring supported on said upper member, a load carrying member supported on said spring, and a spring of different form from said first named spring for supporting said load carrying member in parallel with said first named spring, said last named spring being seated on said lower member, one of said springs being a leaf spring supported by spaced seats disposed on said side frame.

24. In a railway vehicle, spaced side frames having bolster openings therein and a transverse bolster having its ends guided in said openings, each of said side frames having a central spring supporting portion, tension members extending from said spring supporting portion, and columns with bolster guiding surfaces rising upwardly from said spring supporting portion and tension members, said tension members and bolster columns each having spaced side walls integral with the other, semi-elliptic springs extending longitudinally of said side frames beyond said guiding surfaces, housed between walls of said tension members, and having their ends supported at a distance from said spring supporting portion by leaf spring seats fixed with respect to the respective side frames and interposed between the semi-elliptic springs and tension member, said semi-elliptic springs being in load supporting engagement with said bolster, and coil springs supported by said central spring supporting portion on opposite sides of the vertical center line of said semi-elliptic springs, said coil springs being disposed to engage said bolster.

25. In a railway vehicle, spaced side frames having bolster openings therein and a transverse bolster having its ends guided in said openings, each of said side frames having a central spring supporting portion, inclined tension members extending from said spring supporting portion, and columns with bolster guiding surfaces rising upwardly from said spring supporting portion and tension members, said tension members and bolster columns each having spaced side walls integral with the other, each of said tension members having means providing spring seats fixed with respect thereto, semi-elliptic springs extending longitudinally of said side frames intermediate the side walls of said bolster columns and tension members, to beyond said guiding surfaces, and supported by said seats, and coil springs supported by said central spring supporting portion on opposite sides of the vertical center line of said semi-elliptic springs, all of said springs being disposed to support said bolster.

26. In a railway vehicle, the combination of tension and compression members, spaced integral connecting columns forming a window with said tension and compression members, said tension member having a spring housing disposed below said window, said housing having means providing fixed seats therein disposed to be spaced apart a distance substantially greater than the width of said window, said housing being apertured for communication with said window, leaf spring means on said seats, a load carrying member supported on coil springs in said window, and means cooperating to support said load carrying member and extending through the apertured portion and in engagement with said leaf spring means.

27. In a railway vehicle, the combination of tension and compression members, spaced integral connecting columns forming a window with said tension and compression members, said tension member having a spring housing disposed below said window, said housing having means providing fixed seats therein disposed to be spaced apart a distance substantially greater than the width of said window, said housing being formed with an aperture for communication with said window, a semi-elliptic leaf spring supported on said seats, a load carrying member supported on coil springs in said window, and a member cooperating to support said load carrying member and extending through said aperture and in engagement with said semi-elliptic leaf spring.

28. In a railway vehicle, in combination, a side frame having tension and compression members and spaced struts integrally connecting said tension and compression members and forming a window therewith, the tension member between said struts having a seat portion, a housing provided on said tension member below said seat portion, and having a lower web spaced from said seat portion, a load carrying member extending into said window, coil springs interposed between said seat portion and said load carrying member, spaced fixed spring seats disposed in said housing, a longitudinally disposed semi-elliptic leaf spring longer than the distance between said struts seated on said spaced seats, and means interposed between said leaf spring and load carrying member, whereby said load carrying member is resiliently supported on said side frame by said coil and leaf springs.

29. In a railway vehicle, in combination, a side frame having tension and compression members and spaced struts integrally connecting said tension and compression members and forming a window therewith, the tension member between said struts having a seat portion, coil springs supported thereon, a housing provided on said tension member below said seat portion and having a lower web spaced from said seat portion, a load carrying member extending into said window and supported by said coil springs, seats spaced a greater distance apart than the width of said window and fixedly supported in said housing, a semi-elliptic leaf spring having its ends supported on said spaced seats, and means interposed between said leaf spring and load carrying member, whereby said load carrying member is resiliently supported on said side frame by said coil and leaf springs.

30. In a railway vehicle, a side frame having tension and compression members, spaced integral columns connecting and forming a window with said tension and compression members, said tension member having a spring housing portion disposed below said window, said housing portion having an aperture communicating with said window and enclosing means providing seats disposed longitudinally of said frame and spaced apart a distance substantially greater than the width of the window, and being fixed with respect to said side frame, a semi-elliptic leaf spring with its ends supported on said seats, a load carrying member, and means cooperating to support said load carrying member and extending through said aperture and into supporting engagement with said semi-elliptic leaf spring, and coil springs in said window and additionally supporting said load carrying member.

31. In a railway vehicle the combination of a side frame having tension and compression members, spaced struts integrally connecting said tension and compression members and forming a window, said tension member forming a spring housing enclosing seats disposed longitudinally of the frame and spaced apart a distance greater than that between the inner surfaces of said struts and fixed with respect to said side frame, said tension member carrying seats intermediate and above said spaced seats, and a load carrying member supported on said side frame by a leaf spring supported on said spaced seats and coil springs supported on said intermediate seats.

32. In a railway vehicle, a side frame having tension and compression members, spaced integral columns connecting and forming a window with said tension and compression members, said tension member having a spring housing portion disposed below said window, said housing portion having an aperture communicating with said window and enclosing means providing seats disposed longitudinally of said frame and spaced apart a distance substantially greater than the width of the window and being fixed with respect to said side frame, a semi-elliptic leaf spring having its ends supported on the fixed seats, a load carrying member, and means cooperating to support said load carrying member and extending through said aperture and supported by said spring.

33. In a car truck the combination of tension and compression members, spaced integral connecting columns forming a window with said tension and compression members, said tension member having a spring housing disposed below said window, said housing having spaced seats therein fixed with respect thereto and spaced apart a distance substantially greater than the width of said window, said housing being slotted for communication with said window, a semi-elliptic spring supported on the spaced seats, a load carrying member extending into said window and a member cooperating to support said load carrying member and extending through said slot and supported by said spring.

34. In a car truck, the combination of tension and compression members, spaced integral connecting columns forming a window with said tension and compression members, said tension member having a spring housing disposed below said window, said housing having spaced seats therein fixed with respect thereto and spaced apart a distance substantially greater than the width of said window, said housing being slotted for communication with said window, a leaf spring supported on the spaced seats, a load carrying member extending into said window, and a member cooperating to support said load carrying member and extending through said slot and supported by said spring.

35. In a car truck, the combination of tension and compression members, spaced integral connecting columns forming a window with said tension and compression members, said tension member having a spring housing disposed below said window, said housing having spaced seats therein fixed with respect thereto and spaced apart a distance substantially greater than the width of said window, said housing being slotted for communication with said window, vertically acting spring means supported on the spaced seats, a load carrying member extending into said window, and a rigid member extending through said slot and supported by said spring means intermediate the spring seat, said rigid member cooperating to support said load carrying member.

36. In a side frame, the combination of journal boxes, a member connecting said journal boxes, said member having a seat portion, and a spring housing disposed adjacent said seat portion, said seat portion forming a portion of said housing, said housing being provided with spaced leaf spring seats on a portion thereof and within the same.

ROBERT B. COTTRELL.

DISCLAIMER 1,970,841.—*Robert B. Cottrell*, Chicago, Ill. TRUCK. Patent dated August 21, 1934. Disclaimer filed May 11, 1936, by the patentee; the assignee, *American Steel Foundries*, approving.
Hereby disclaims claims 24 and 25 of said patent.
[*Official Gazette June 2, 1936.*]

sion and compression members and forming a window therewith, the tension member between said struts having a seat portion, a housing provided on said tension member below said seat portion, and having a lower web spaced from said seat portion, a load carrying member extending into said window, coil springs interposed between said seat portion and said load carrying member, spaced fixed spring seats disposed in said housing, a longitudinally disposed semi-elliptic leaf spring longer than the distance between said struts seated on said spaced seats, and means interposed between said leaf spring and load carrying member, whereby said load carrying member is resiliently supported on said side frame by said coil and leaf springs.

29. In a railway vehicle, in combination, a side frame having tension and compression members and spaced struts integrally connecting said tension and compression members and forming a window therewith, the tension member between said struts having a seat portion, coil springs supported thereon, a housing provided on said tension member below said seat portion and having a lower web spaced from said seat portion, a load carrying member extending into said window and supported by said coil springs, seats spaced a greater distance apart than the width of said window and fixedly supported in said housing, a semi-elliptic leaf spring having its ends supported on said spaced seats, and means interposed between said leaf spring and load carrying member, whereby said load carrying member is resiliently supported on said side frame by said coil and leaf springs.

30. In a railway vehicle, a side frame having tension and compression members, spaced integral columns connecting and forming a window with said tension and compression members, said tension member having a spring housing portion disposed below said window, said housing portion having an aperture communicating with said window and enclosing means providing seats disposed longitudinally of said frame and spaced apart a distance substantially greater than the width of the window, and being fixed with respect to said side frame, a semi-elliptic leaf spring with its ends supported on said seats, a load carrying member, and means cooperating to support said load carrying member and extending through said aperture and into supporting engagement with said semi-elliptic leaf spring, and coil springs in said window and additionally supporting said load carrying member.

31. In a railway vehicle the combination of a side frame having tension and compression members, spaced struts integrally connecting said tension and compression members and forming a window, said tension member forming a spring housing enclosing seats disposed longitudinally of the frame and spaced apart a distance greater than that between the inner surfaces of said struts and fixed with respect to said side frame, said tension member carrying seats intermediate and above said spaced seats, and a load carrying member supported on said side frame by a leaf spring supported on said spaced seats and coil springs supported on said intermediate seats.

32. In a railway vehicle, a side frame having tension and compression members, spaced integral columns connecting and forming a window with said tension and compression members, said tension member having a spring housing portion disposed below said window, said housing portion having an aperture communicating with said window and enclosing means providing seats disposed longitudinally of said frame and spaced apart a distance substantially greater than the width of the window and being fixed with respect to said side frame, a semi-elliptic leaf spring having its ends supported on the fixed seats, a load carrying member, and means cooperating to support said load carrying member and extending through said aperture and supported by said spring.

33. In a car truck the combination of tension and compression members, spaced integral connecting columns forming a window with said tension and compression members, said tension member having a spring housing disposed below said window, said housing having spaced seats therein fixed with respect thereto and spaced apart a distance substantially greater than the width of said window, said housing being slotted for communication with said window, a semi-elliptic spring supported on the spaced seats, a load carrying member extending into said window and a member cooperating to support said load carrying member and extending through said slot and supported by said spring.

34. In a car truck, the combination of tension and compression members, spaced integral connecting columns forming a window with said tension and compression members, said tension member having a spring housing disposed below said window, said housing having spaced seats therein fixed with respect thereto and spaced apart a distance substantially greater than the width of said window, said housing being slotted for communication with said window, a leaf spring supported on the spaced seats, a load carrying member extending into said window, and a member cooperating to support said load carrying member and extending through said slot and supported by said spring.

35. In a car truck, the combination of tension and compression members, spaced integral connecting columns forming a window with said tension and compression members, said tension member having a spring housing disposed below said window, said housing having spaced seats therein fixed with respect thereto and spaced apart a distance substantially greater than the width of said window, said housing being slotted for communication with said window, vertically acting spring means supported on the spaced seats, a load carrying member extending into said window, and a rigid member extending through said slot and supported by said spring means intermediate the spring seat, said rigid member cooperating to support said load carrying member.

36. In a side frame, the combination of journal boxes, a member connecting said journal boxes, said member having a seat portion, and a spring housing disposed adjacent said seat portion, said seat portion forming a portion of said housing, said housing being provided with spaced leaf spring seats on a portion thereof and within the same.

ROBERT B. COTTRELL.

DISCLAIMER 1,970,841.—*Robert B. Cottrell*, Chicago, Ill. TRUCK. Patent dated August 21, 1934. Disclaimer filed May 11, 1936, by the patentee; the assignee, *American Steel Foundries*, approving.

Hereby disclaims claims 24 and 25 of said patent.

[*Official Gazette June 2, 1936.*]